Aug. 23, 1932.  H. W. LORD  1,873,652
ELECTRIC VALVE RECTIFYING SYSTEM
Filed Dec. 31, 1931
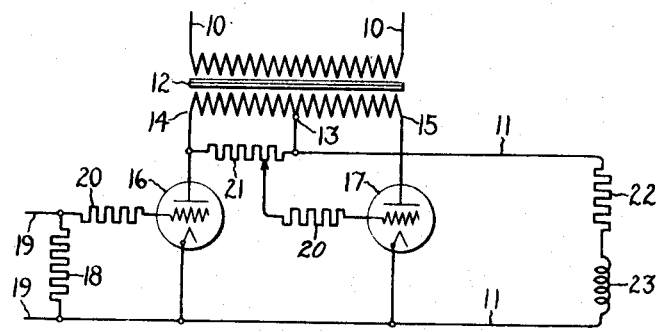
Inventor:
Harold W. Lord,
by Charles V. Tueller
His Attorney.

Patented Aug. 23, 1932

1,873,652

UNITED STATES PATENT OFFICE

HAROLD W. LORD, OF SCHENECTADY, NEW YORK, ASSIGNOR TO GENERAL ELECTRIC COMPANY, A CORPORATION OF NEW YORK

ELECTRIC VALVE RECTIFYING SYSTEM

Application filed December 31, 1931. Serial No. 584,078.

My invention relates to electric valve rectifying systems, and more particularly to such systems in which the average potential of the direct current circuit may be controlled by controlling the conductivity of the electric valves.

Heretofore there have been proposed numerous electric valve rectifying systems including grid controlled electric valves in which the average potential of the direct current circuit is controlled by varying the magnitude or phase relation, or both, of the potential applied to the control grids of the electric valves. In cases where it has been found desirable to use a pair of electric valves connected for full wave rectification, it has been customary to use a grid transformer in order to supply control potentials of opposite polarity to the grids of the two electric valves. In certain instances, however, the amount of energy available for controlling the grids of the electric valves is too small to operate satisfactorily with a grid transformer, which comprises a load on the grid circuit.

It is an object of my invention, therefore, to provide an improved electric valve rectifying system which will overcome the above-mentioned disadvantages of the arrangements of the prior art, and which will be simple and reliable in operation.

It is another object of my invention to provide an improved electric valve rectifying system in which the average potential of the direct current circuit may be controlled by an extremely small amount of grid control energy.

It is a further object of my invention to provide an improved electric valve rectifying system in which the average potential of the direct current circuit may be controlled by impressing an external control potential on a single one of the electric valves.

In accordance with one embodiment of my invention direct and alternating current circuits are interconnected through an inductive winding provided with an electrical mid-point connected to one side of the direct current circuit, and with end terminals connected to the other side of the direct current circuit through a pair of electric valves. The grid of one of the electric valves is energized from an external control circuit while a potentiometer connected between the electrical mid-point of the inductive winding and the outer terminal thereof connected to this valve forms a source of excitation of the control grid of the other electric valve.

For a better understanding of my invention, together with other and further objects thereof, reference is had to the following description taken in connection with the accompanying drawing and its scope will be pointed out in the appended claims. The single figure of the drawing illustrates an arrangement embodying my invention for transmitting energy from an alternating current circuit to a direct current circuit.

Referring now more particularly to the drawing, there is illustrated an arrangement for transmitting energy from an alternating current circuit 10 to a direct current circuit 11. This apparatus comprises a transformer 12 having a primary winding connected to the circuit 10 and a secondary winding provided with an electrical mid-point 13 connected to one side of the direct current circuit 11 and with end terminals 14 and 15 connected to the other side of the direct current circuit through electric valves 16 and 17, respectively. The electric valves 16 and 17 are each provided with an anode, a cathode, and a control grid and may be of any of the several types well known in the art, although I prefer to use valves of the vapor electric discharge type. The control grid of electric valve 16 may be energized in accordance with the potential across an impedance 18 included in a control circuit 19, and if desired, a current limiting resistor 20 may be included in the grid circuit. It will be understood that the control circuit 19 may be energized with any suitable control potential for controlling the conductivity of the electric valve 16, such for example, as with an alternating potential variable in phase, or with a unidirectional potential variable in magnitude, or a combination of these two. In order to control the conductivity of electric valve 17, a potentiometer 21 is connected between the electrical mid-point 13 and the end terminal 14 of the secondary winding of the transformer 12 and the grid of the valve 17 is connected to an intermediate point of this potentiometer through a current limiting resistor 20, as illustrated. However, it will be understood by those skilled in the art that the potentiometer 21 may be omitted if the winding between the terminals 13 and 14 is provided with one or more intermediate terminals to which a grid connection can be made. The load supplied by the direct current circuit 11 is illustrated diagrammatically as comprising a resistance 22 and a reactance 23, although it will be understood that any load device may be energized therefrom. However, it has been found that the circuit operates most satisfactorily when the load circuit is at least slightly inductive.

In explaining the operation of the above-described apparatus, it will be assumed that, initially, both electric valves 16 and 17 are non-conductive. If the potential of the control grid of electric valve 16, as determined by the control circuit 19, becomes positive at any instant when the potential of the terminal 14 connected to the anode of the valve 16 is positive, the valve 16 is made conducting and current will continue to flow for the remainder of that half cycle, as is well understood by those skilled in the art. When the potential of the alternating current circuit 10 reverses polarity, however, the current is not interrupted immediately in electric valve 16 since the inductance 23 maintains this current for a portion of the succeeding half cycle against the electromotive force of the left-hand portion of the secondary winding of the transformer 12. So long as electric valve 16 is conductive, it will be noted that the potential on the grid of the valve 17 is that appearing across the left-hand portion of potentiometer 21 and that this potential is in phase with the anode-cathode potential of electric valve 17, so that valve 17 will become conductive whenever its anode potential becomes positive. In this manner, so long as a positive potential is maintained upon the grid of the valve 17 or so long as its grid potential is positive for any portion of the successive half cycles of positive anode potential of this valve, the apparatus will function as a full wave rectifier supplying unidirectional current to the load circuit 11. When there is no current flowing in either valve, however, it will be noted that the cathode of valve 17 is connected to the electrical mid-point 13 through the devices 22 and 23, so that the potential impressed upon the grid of the valve 17 is that appearing across the right-hand portion of the potentiometer 21, which is in phase opposition to the anode-cathode potential of the valve 17. That is, electric valve 17 is maintained non-conductive whenever electric valve 16 is non-conductive and no current is supplied to the direct current load circuit 11.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric valve rectifying system comprising a source of alternating current, a direct current load circuit, a pair of grid controlled electric valves interconnecting said circuits, an external control circuit connected to the grid of only one of said valves for controlling the conductivity thereof, means for normally maintaining the other valve non-conductive and for controlling the conductivity of said other valve in response to the conductivity of said first mentioned valve.

2. An electric valve rectifying system comprising a source of alternating current, a direct current load circuit, a pair of grid controlled electric valves interconnecting said circuits, an external control circuit connected to the grid of only one of said valves for controlling the conductivity thereof, means for normally impressing upon the grid of the other of said valves an alternating potential substantially in phase opposition to its anode potential and for impressing thereon an alternating potential substantially in phase with its anode potential in response to the conductivity of said first mentioned valve.

3. An electric valve rectifying system comprising a source of alternating current, a direct current load circuit, a pair of grid controlled electric valves interconnecting said circuits, an external control circuit connected to the grid of only one of said valves for controlling the conductivity thereof, and a connection from the grid of the other valve to a point in said system whereby the conductivity of said last mentioned valve is controlled in accordance with the conductivity of said first mentioned valve.

4. An electric valve rectifying system comprising a source of alternating current, a direct current load circuit, a pair of grid controlled electric valves interconnecting said circuits, an external control circuit connected to the grid of only one of said valves for controlling the conductivity thereof, and a connection from the grid of the other valve to a point in the system the potential of which reverses polarity with respect to its cathode when said first mentioned valve is rendered conductive.

5. An electric valve rectifying system comprising a source of alternating current, a direct current load circuit, a pair of electric valves each provided with an anode, a cathode, and a control grid, an inductive winding energized from said source and provided with an electrical mid-point connected to one side of said direct current circuit and with end terminals connected to the other side of said direct current circuit through said valves, an external control circuit connected to the grid of only one of said valves for controlling the conductivity thereof, a potentiometer connected between said electrical mid-point and the terminal of said winding connected to said first mentioned valve, and a connection from the grid of the other of said valves to an intermediate point of said potentiometer.

In witness whereof, I have hereunto set my hand.

HAROLD W. LORD.